(12) United States Patent
Khiabani et al.

(10) Patent No.: US 11,783,643 B1
(45) Date of Patent: Oct. 10, 2023

(54) SYSTEM AND/OR METHOD FOR PREDICTING USER ACTION IN CONNECTION WITH A VEHICLE USER INTERFACE USING MACHINE LEARNING

(71) Applicant: Mercedes-Benz Group AG, Stuttgart (DE)

(72) Inventors: Yahya Sowti Khiabani, Fremont, CA (US); Chieh Hsu, Milpitas, CA (US); Charles Furrer, San Francisco, CA (US); Dat Nguyen, Milpitas, CA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/300,938

(22) Filed: Apr. 14, 2023

Related U.S. Application Data

(63) Continuation of application No. 18/066,959, filed on Dec. 15, 2022.

(51) Int. Cl.
*G07C 5/08* (2006.01)
*G06N 5/022* (2023.01)

(52) U.S. Cl.
CPC ........... *G07C 5/0808* (2013.01); *G06N 5/022* (2013.01); *G07C 5/0816* (2013.01); *G07C 5/0841* (2013.01); *B60W 2540/00* (2013.01)

(58) Field of Classification Search
CPC .. G07C 5/0808; G07C 5/0816; G07C 5/0841; G06N 5/022; B60W 2540/00
See application file for complete search history.

(56) References Cited

U.S. PATENT DOCUMENTS

2016/0360382 A1* 12/2016 Gross ...................... G06F 9/453

FOREIGN PATENT DOCUMENTS

JP   2018184115 A   11/2018

OTHER PUBLICATIONS

AppsFlyer, "Predictive modeling for app marketers: The complete guide", https://www.appsflyer.com/resources/guides/predictive-modeling-for-mobile-marketers/, retrieved on Aug. 11, 2023, 13 pages.

* cited by examiner

*Primary Examiner* — Michael V Kerrigan
(74) *Attorney, Agent, or Firm* — Dority & Manning, P.A.

(57) ABSTRACT

Disclosed are a system, method and system to predict an individual's action in connection with a vehicle user interface using machine learning. One or more models may be developed based, at least in part, on observations of past actions by the individual among the plurality of target actions by the individual. Extracted features of a current context may be applied to the developed one or more models to predict a subsequent action among the target actions by the individual.

20 Claims, 12 Drawing Sheets

| | Call dad (10am)(Th) | Call mom |
|---|---|---|
| Call mom (10am) (TH) | 0.1 + 0.75 = 0.85 | 0.1 + 0.75 = 0.85 |
| Call dad (10am) (TH) | 0.85 * 0.9 = 0.765 | 0.85 * 0.9 = 0.765 |
| Call mom (8am) (TH) | 0.765 * 0.9 = 0.69 | 0.765 * 0.9 + 0.75 = 1.438 |
| Call mom (10am) (TH) | 0.69 * 0.9 + 0.75 = 1.37 | 1.438 * 0.9 + 0.75 = 2.045 |
| Call dad (10am) (TH) | 1.37 * 0.9 = 1.233 | 2.045 * 0.9 = 1.84 |
| Call mom (10am) (TH) | 1.233 * 0.9 = 1.11 | 2.04 * 0.9 + 0.75 = 2.406 |
| Call dad (10am) (TH) | 1.11 * 0.9 + 0.75 = 1.75 | 2.406 * 0.9 + 0.75 = 2.915 |
| Call dad (10am) (TH) | 1.75 * 0.9 = 1.575 | 2.915 * 0.9 = 2.624 |
| Call mom (10am) (TH) | | 2.624 * 0.9 + 0.75 = 3.11 |

FIG. 6

SYSTEM AND/OR METHOD FOR PREDICTING USER ACTION IN CONNECTION WITH A VEHICLE USER INTERFACE USING MACHINE LEARNING

PRIORITY CLAIM

The present application is a continuation of U.S. application Ser. No. 18/066,959 having a filing date of Dec. 15, 2022. Applicant claims priority to and the benefit of each of such applications and incorporate all such applications herein by reference in its entirety.

BACKGROUND

1. Field

This disclosure relates to methods and/or techniques for predicting actions of individuals in their interactions with a machine.

2. Information

User interfaces enable individual users to interact with processes executing on a machine to, for example, provide user inputs, selections and/or preferences. Such a user interface may display or otherwise present to the user selectable options. The user interface may then receive user selections from among presented user selectable options from a touch on a touchscreen or voice selection, just to provide a couple of examples of how a user may select from among options presented by a user interface.

SUMMARY

One embodiment disclosed herein is directed to a system to be disposed in a vehicle, the system comprising: one or more memory devices; and one or more processors coupled to the memory devices configured to: determine features indicative of a context in which the vehicle is currently operating and/or a context in which a driver and/or a passenger is/are currently operating the vehicle; generate a prediction of a future vehicle user interface action, from among a plurality of available vehicle user interface actions, wherein the prediction to be generated based, at least in part, on: the features indicative of the context in which the vehicle is currently operating or the context in which the driver and/or the passenger is/are currently operating the vehicle; and user action context parameters relating: (i) at least one past vehicle user interface action requested by at least one past driver and/or past passenger of an associated vehicle, and (ii) determined features of an observed past context in which the associated vehicle was operating and/or in which the at least one past driver and/or past passenger was/were operating the associated vehicle contemporaneous with the at least one past driver and/or past passenger requesting the at least one past vehicle user interface action; and cause a user interface in the vehicle to generate an output based on the prediction of the future vehicle user interface action. In one implementation, the one or more processors are further configured to: determine parameters indicative of posterior probabilities of the plurality of available vehicle user interface actions, respectively, based at least in part on the determined features of the context in which the vehicle is currently operating and/or in which the past driver and/or past passenger is currently operating the vehicle, and generate the prediction of the future vehicle user interface action based, at least in part, on the parameters indicative of computed posterior probabilities of the plurality of available vehicle user interface actions. For example, the parameters indicative of posterior probability may be conditioned on the features indicative of the context in which the vehicle is currently operating or the context in which the driver and/or the passenger is/are currently operating the vehicle based, at least in part, on a Bayes model. In another particular implementation, the one or more processors are further configured to: update the parameters indicative of posterior probabilities of the plurality of available vehicle user interface actions based, at least in part, on the prediction of the future vehicle user interface action and an actual observed vehicle user interface action. In another particular implementation, the one or more processors are further configured to: for each of the plurality of available vehicle user interface actions, compute a probability of the features indicative of the context in which the vehicle is currently operating and/or the context in which the driver and/or the passenger is/are currently operating the vehicle; sum computed probabilities of the features indicative of the context in which the vehicle is currently operating and/or the context in which the driver and/or the passenger is/are currently operating the vehicle conditioned on the plurality of available vehicle user interface actions; and determine the parameters indicative of posterior probability conditioned on the features indicative of the context in which the vehicle is currently operating or the context in which the driver and/or the passenger is/are currently operating the vehicle based, at least in part, on the summed computed probabilities. In another particular implementation, the one or more processors are further configured to: identify a plurality of context attributes of the features indicative of the context in which the vehicle is currently operating and/or the context in which the driver and/or the passenger is/are currently operating the vehicle; establish a model for each of the plurality of context attributes of the features of the context in which the vehicle is currently operating and/or the context in which the driver and/or the passenger is/are currently operating the vehicle; and determine computed probabilities of the features indicative of the context in which the vehicle is currently operating and/or the context in which the driver and/or the passenger is/are currently operating the vehicle conditioned on the plurality of available vehicle user interface actions based, at least on in part, on the models of the context attributes of the features indicative of the context in which the vehicle is currently operating and/or the context in which the driver and/or the passenger is/are currently operating the vehicle. In another particular implementation, the one or more processors are further configured to: for each established model, compute a reliability weight based, at least in part, on past predictions and associated detected actual observed vehicle user interface actions; and for at least one of the plurality of available vehicle user interface actions, determine a predicted probability of at least one of the plurality of available vehicle user interface actions based, at least in part, on a sum of probabilities based on the established model weighted according to computed reliability weights. In another particular implementation, the system further one or more sensors, and wherein the one or more processors are further configured to: determine the features indicative of the context in which the vehicle is currently operating and/or the context in which the driver and/or the passenger is/are currently operating the vehicle based, at least in part, on signals from the one or more sensors.

Another embodiment disclosed herein is directed to a method comprising: determining, by one or more processors within, or in communication with, a vehicle, features indicative of a context in which the vehicle is currently operating and/or a context in which a driver and/or a passenger is/are currently operating the vehicle; generating, by the one or more processors, a prediction of a future vehicle user interface action, from among a plurality of available vehicle user interface actions, wherein the prediction is generated based, at least in part, on: the features indicative of the context in which the vehicle is currently operating or the context in which the driver and/or the passenger is/are currently operating the vehicle; and user action context parameters relating: (i) at least one past vehicle user interface action requested by at least one past driver and/or past passenger of an associated vehicle, and (ii) determined features of an observed past context in which the associated vehicle was operating and/or in which the at least one past driver and/or past passenger was/were operating the associated vehicle contemporaneous with the at least one past driver and/or past passenger requesting the at least one past vehicle user interface action; and causing a user interface in the vehicle to generate an output based on the prediction of the future vehicle user interface action. In one particular implementation, generating the prediction of the future vehicle user interface action further comprises: determining parameters indicative of posterior probabilities of the plurality of available vehicle user interface actions, respectively, based at least in part on the determined features of the context in which the vehicle is currently operating and/or in which the past driver and/or past passenger is currently operating the vehicle, and generating the prediction of the future vehicle user interface action based, at least in part, on the parameters indicative of computed posterior probabilities of the plurality of available vehicle user interface actions. For example, the parameters indicative of posterior probability are conditioned on the features indicative of the context in which the vehicle is currently operating and/or the context in which the driver and/or the passenger is/are currently operating the vehicle based, at least in part, on a Bayes model. In another particular implementation, the method further comprises: updating the parameters indicative of posterior probabilities of the plurality of available vehicle user interface actions based, at least in part, on the prediction of the future vehicle user interface action and an actual observed vehicle user interface action. In another particular implementation, the method further comprises: for each of the plurality of available vehicle user interface actions, computing a probability of the features indicative of the context in which the vehicle is currently operating and/or the context in which the driver and/or the passenger is/are currently operating the vehicle; summing computed probabilities of the features indicative of the context in which the vehicle is currently operating and/or the context in which the driver and/or the passenger is/are currently operating the vehicle conditioned on the plurality of available vehicle user interface actions; and determining the parameters indicative of posterior probability conditioned on the features indicative of the context in which the vehicle is currently operating or the context in which the driver and/or the passenger is/are currently operating the vehicle based, at least in part, on the summed computed probabilities. In another particular implementation, the method further comprises: identifying a plurality of context attributes of the features indicative of the context in which the vehicle is currently operating and/or the context in which the driver and/or the passenger is/are currently operating the vehicle; establishing a model for each of the plurality of context attributes of the features of the context in which the vehicle is currently operating and/or the context in which the driver and/or the passenger is/are currently operating the vehicle; and determining the computed probabilities of the features indicative of the context in which the vehicle is currently operating and/or the context in which the driver and/or the passenger is/are currently operating the vehicle conditioned on the plurality of available vehicle user interface actions based, at least on in part, on the models of the context attributes of the features indicative of the context in which the vehicle is currently operating and/or the context in which the driver and/or the passenger is/are currently operating the vehicle. In another particular implementation, the method further comprises: for each of established model, computing a reliability weight based, at least in part, on past predictions and associated detected actual observed vehicle user interface actions; and for at least one of the plurality of available vehicle user interface actions, determining a predicted probability of at least one of the plurality of available vehicle user interface actions based, at least in part, on a sum of probabilities based on the established model weighted according to computed reliability weights. In another particular implementation, the method further comprises determining the features indicative of the context in which the vehicle is currently operating and/or the context in which the driver and/or the passenger is/are currently operating the vehicle based, at least in part, on signals from one or more sensors.

Another embodiment is directed to an article comprising: a non-transitory storage medium comprising computer-readable instructions stored thereon, the instructions to be executable by one or more processors to: determine features indicative of a context in which a vehicle is currently operating and/or a context in which a driver and/or a passenger is/are currently operating the vehicle; generate a prediction of a future vehicle user interface action, from among a plurality of available vehicle user interface actions, wherein the prediction to be generated based, at least in part, on: the features indicative of the context in which the vehicle is currently operating or the context in which the driver and/or the passenger is/are currently operating the vehicle; and user action context parameters relating: (i) at least one past vehicle user interface action requested by at least one past driver and/or past passenger of an associated vehicle, and (ii) determined features of an observed past context in which the associated vehicle was operating and/or in which the at least one past driver and/or past passenger was/were operating the associated vehicle contemporaneous with the at least one past driver and/or past passenger requesting the at least one past vehicle user interface action; and cause a user interface in the vehicle to generate an output based on the prediction of the future vehicle user interface action. In a particular implementation, the instructions are further executable by the one or more processors to: determine parameters indicative of posterior probabilities of the plurality of available vehicle user interface actions, respectively, based at least in part on the determined features of the context in which the vehicle is currently operating and/or in which the past driver and/or past passenger is currently operating the vehicle, and generate the prediction of the future vehicle user interface action based, at least in part, on the parameters indicative of computed posterior probabilities of the plurality of available vehicle user interface actions. In another particular implementation, the parameters indicative of posterior probability are conditioned on the features indicative of the context in which the vehicle is currently operating or the context in which the driver and/or the passenger is/are currently operating the vehicle based, at least in part, on a Bayes model. In another particular implementation, the instructions are further executable by the one or more processors to: update the parameters indicative of posterior probabilities of the plurality of available vehicle user interface actions based, at least in part, on the prediction of the future vehicle user interface action and an actual observed vehicle user interface action. In yet another particular implementation, the instructions are further executable by the one or more processors to: receive updated features indicative of the context in which the vehicle is currently operating and/or the context in which the driver and/or the passenger is/are currently operating the vehicle; determine whether a predetermined amount of time has elapsed since the prediction was generated; and in response to determination that the predetermined amount of time has elapsed since the prediction was generated, generate an updated prediction based on the updated features.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIGS. 5, 6 and 7 are schematic diagrams of example applications to predict a user interface action, according to an embodiment;

Figure 1A:
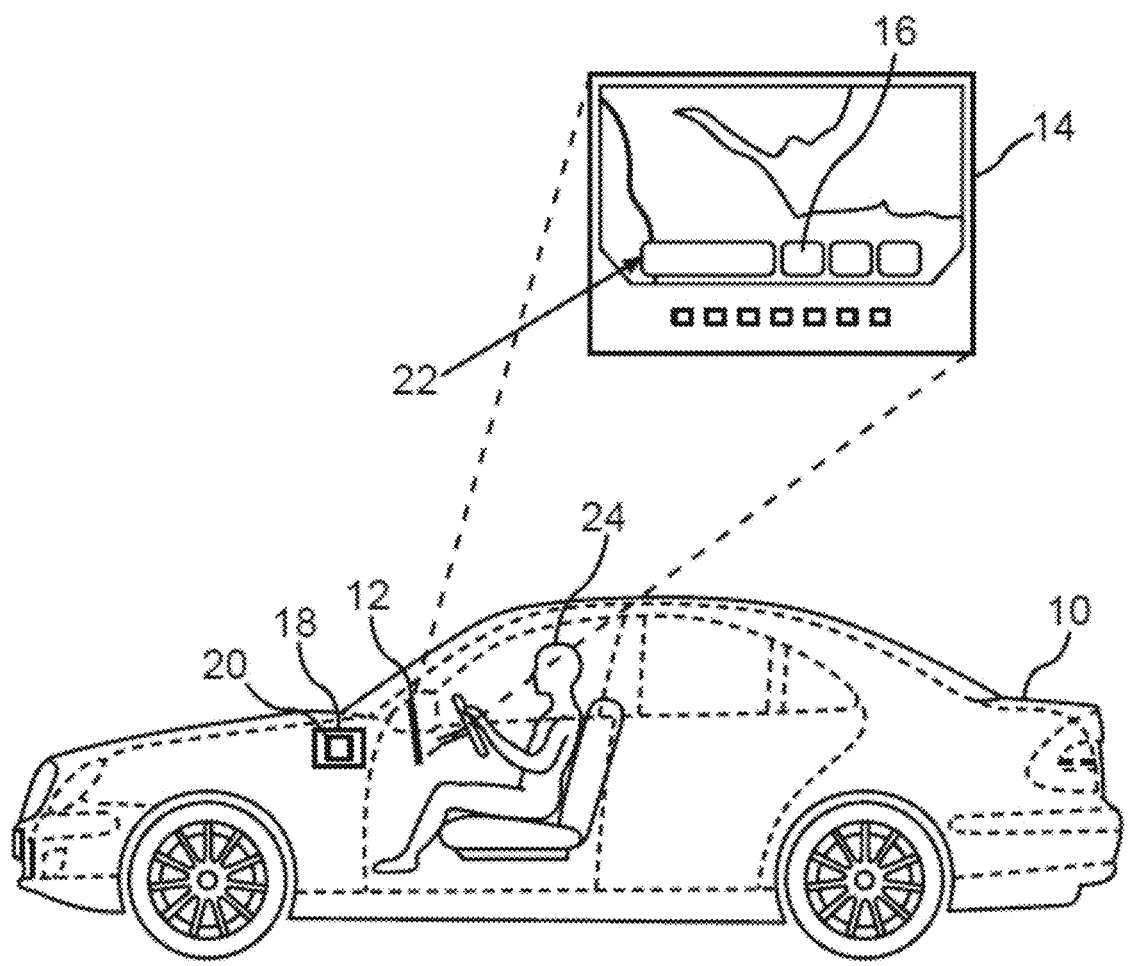
FIG. 1A is a schematic side view according to an embodiment of a motor vehicle with an embodiment of a display.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents. Further, it is to be understood that other embodiments may be utilized. Also, embodiments have been provided of claimed subject matter and it is noted that, as such, those illustrative embodiments are inventive and/or unconventional; however, claimed subject matter is not limited to embodiments provided primarily for illustrative purposes. Thus, while advantages have been described in connection with illustrative embodiments, claimed subject matter is inventive and/or unconventional for additional reasons not expressly mentioned in connection with those embodiments. In addition, references throughout this specification to "claimed subject matter" refer to subject matter intended to be covered by one or more claims, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

According to an embodiment, modern motor vehicle user interfaces may receive selections/user inputs from a driver and/or passenger based, at least in part, on interaction with a user interface, such as a user interface including display device (e.g., touchscreen). In an implementation, a display device may present to a driver and/or passenger a menu of selectable options for various functions such as options for entertainment, navigation, communication or environment control functions, just to provide a few examples.

According to an embodiment, a user action prediction (UAP) model may enable vehicle user interfaces to more conveniently present to a driver and/or passenger preferred selections. According to an embodiment, a UAP model may automatically update most likely subsequent user interface actions a driver and/or passenger is/are to take based, at least in part, on learned preferences of the driver and/or passenger. The user interface action may be a user selection or other user action associated with a user interface (and a vehicle user interface action may be an action associated with a vehicle user interface). A UAP model may support vehicle user interface actions associated with navigation (e.g., trips), entertainment/media, climate control, and phone call use-cases, just to provide a few example functions. In one embodiment, a UAP may provide suggestions to head unit to enable an easy and intuitive approach to using the head unit, by surfacing likely user interface actions to the top of a user interface (UI). This may decrease a number of steps for a driver/passenger to take an action, creating a more enjoyable, less frustrating and less distracting driving/riding experience.

FIG. 1A shows a schematic side view according to an embodiment of a motor vehicle 10 comprising a display device 12. In particular, the display device 12 is for displaying an individual home screen 14, which is shown in an enlarged view. At least one functionality symbol 16 is shown on home screen 14, wherein display device 12 comprises at least one electronic computing device 18. In particular, electronic computing device 18 may comprise an artificial intelligence, in particular at least one kernel 20 and/or a plurality of kernels 20.

In particular, the home screen may, for example, show at least one static functionality symbol 22 which may be, for example, a navigation screen and/or a tile for a phone call. In particular, a set of functionalities is provided to a user 24 of motor vehicle 10 and/or display device 12, wherein the static functionality symbol 22 is provided on the entertainment module, for example, a static phone module, active tiles to be consistently shown while user 24 is performing certain actions as well as suggested functionalities based on artificial intelligence learning. A persistent user interface background, which is shown as the dynamic global positioning (GPS) map is shown in FIG. 1A. Layered on top is, for example, a global search function as well as the so-called magic dock at bottom, which may be, for example, a first functionality symbol 16 or a second functionality symbol 16.

An entertainment tile, shown in the expanded form, can retract to the size of the smallest tile, or across or almost across the entire dock length, if no suggestions are relevant. The static phone tile follows if a phone is connected, followed by any active use case. Examples of active use cases may be an ongoing seat massage program, phone call or seat heating activity, directly providing the user with the option to immediately engage with the ongoing activity. Finally, there are personalized tile suggestions fueled by the electronic computing device 18 comprising a subset of the suggested use cases that the system has learned the user 24 cares about in a given context situation.

According to an embodiment, a UAP model may be at least in part implemented in electronic computing device 18 to, for example, affect content presented to user 24 on display device 12. In one particular implementation, such a UAP model implemented at least in part in electronic computing device 18 may affect features of home screen 14 based, at least in part, on a context in which motor vehicle 10 is currently operating and/or a context in which user 24 may be operating motor vehicle 10. According to an embodiment, a UAP model may make suggestions as predicted based on past behaviors of user 24. Such incidents past behaviors may be observed directly by the UAP and/or expressed by messages from an external system.

According to an embodiment, features indicative of a current operating context of a driver, passenger and/or vehicle may be applied to one or more models to predict a subsequent selection of a vehicle user interface action from among a plurality of vehicle user interface actions available to the driver and/or passenger. In a particular implementation, such a prediction may be based, at least in part, on application of features indicative of the current operating context of the driver, passenger and/or vehicle to one or more predictive models. Such a predictive model may be based, at least in part, on parameters relating at least one past vehicle user interface action requested by at least one driver (or passenger) of an associated vehicle and features of an observed past operating context of the driver, passenger and/or vehicle contemporaneous with the past requested vehicle user interface action. Prediction of subsequent selection of a vehicle user interface action may then be used to drive a user interface to present selectable vehicle user interface actions.

Some implementations of an artificial intelligence in a UAP may employ computationally intensive methods such as application of neural network techniques that require expensive hardware, consume significant power from a vehicle's electrical system and require exhaustive training over many training epochs/iterations. In one implementation, one or more processors (e.g., in combination with one or more memory devices) within, or in communication with, a vehicle, may determine features indicative of a context in which the vehicle is currently operating and/or a context in which a driver and/or a passenger is/are currently operating the vehicle (hereinafter "contemporaneous context") and generate a prediction of a future vehicle user interface action, from among a plurality of available vehicle user interface actions. For example, one or more processors may execute instructions stored on one or more memory devices to determine a contemporaneous context and generate a prediction of a future vehicle user interface action. In an embodiment, a "context" in which a driver and/or passenger is operating a vehicle, or in which the vehicle is operating, may refer to one or more circumstances, settings (e.g., time and/or location), conditions, or situations in which the driver and/or passenger is operating the vehicle or in which the vehicle is operating.

Such a prediction of a future vehicle context may be generated based, at least in part, on: the features indicative of a contemporaneous context; and user action context parameters. Such user action context parameters may relate: (i) at least one past vehicle user interface action requested by at least one past driver and/or past passenger of an associated vehicle, and (ii) determined features of an observed past context in which the associated vehicle was operating and/or in which the at least one past driver and/or past passenger was/were operating the associated vehicle contemporaneous with the at least one past driver and/or past passenger requesting the at least one past vehicle user interface action. In a particular implementation, a user interface may generate an output based on the prediction of the future vehicle user interface action as part of a UAP. In an embodiment, such a prediction may be an estimate of a likelihood of a driver or passenger making a particular selection or taking other action with respect to a vehicle user interface in the future, or more particularly may be an indication that a particular vehicle user interface action is likely in the future. The output generated by the user interface may anticipate the likely future vehicle user interface action, and may be presented to the user (the driver or passenger) without requiring the user to actually perform the vehicle user interface action.

In one implementation, a system comprising one or more memory devices and one or more processors coupled to the one or more memory devices within, or in communication with, a vehicle may generate a prediction of a future vehicle user interface action by: determining parameters indicative of posterior probabilities of the plurality of available vehicle user interface actions, respectively, based at least in part on the determined features of the context in which the vehicle is currently operating and/or in which the past driver and/or the past passenger is currently operating the vehicle, and generating the prediction of the future vehicle user interface action based, at least in part, on the parameters indicative of computed posterior probabilities of the plurality of available vehicle user interface actions. Such parameters indicative of posterior probability may be conditioned on the features indicative of a contemporaneous context based, at least in part, on a Bayes model. Parameters indicative of posterior probabilities of the plurality of available vehicle user interface actions may be updated based, at least in part, on a prediction of the future vehicle user interface action and an actual observed vehicle user interface action.

In another implementation, the one or more processors within, or in communication with, a vehicle may, for each of a plurality of available vehicle user interface actions, compute a probability of the features indicative of a contemporaneous context; sum computed probabilities of the current contemporaneous conditioned on the plurality of available vehicle user interface actions; and determine the parameters indicative of posterior probability conditioned on the features indicative of the contemporaneous context based, at least in part, on the summed computed probabilities.

In an implementation, for a specific user-selected action, a context under which the specific action takes place may be observed. At each instance of such a specific action, weights associated with the context under which the specific action takes place are updated to determine a likelihood of that context. In addition, by observing a number of times that the specific action has been selected by user, independent of context, associated weights of that specific action may be weighted to determine an associated prior. Based, at least in part, on these two probabilities of prior and likelihood, a posterior probability of that specific action given a contemporaneous context may be computed using Bayes rule. In one implementation, using different models the posterior probabilities for each of a plurality of subsets of the contemporaneous context may be computed. A weighted average of the computed posterior probabilities may be computed to determine a total likelihood of that action being selected/taken given the contemporaneous context.

According to an embodiment, affecting a user interface based on a prediction of a future vehicle use interface action computed based on the features indicative of a contemporaneous context; and user action context parameters may enable simplifying and/or reducing use of limited computation resources (e.g., hardware and electric power) of a vehicle without significant loss in user interface performance. As such, particular implementations present a technological improvement/solution to a technological problem.

Figure 1B:
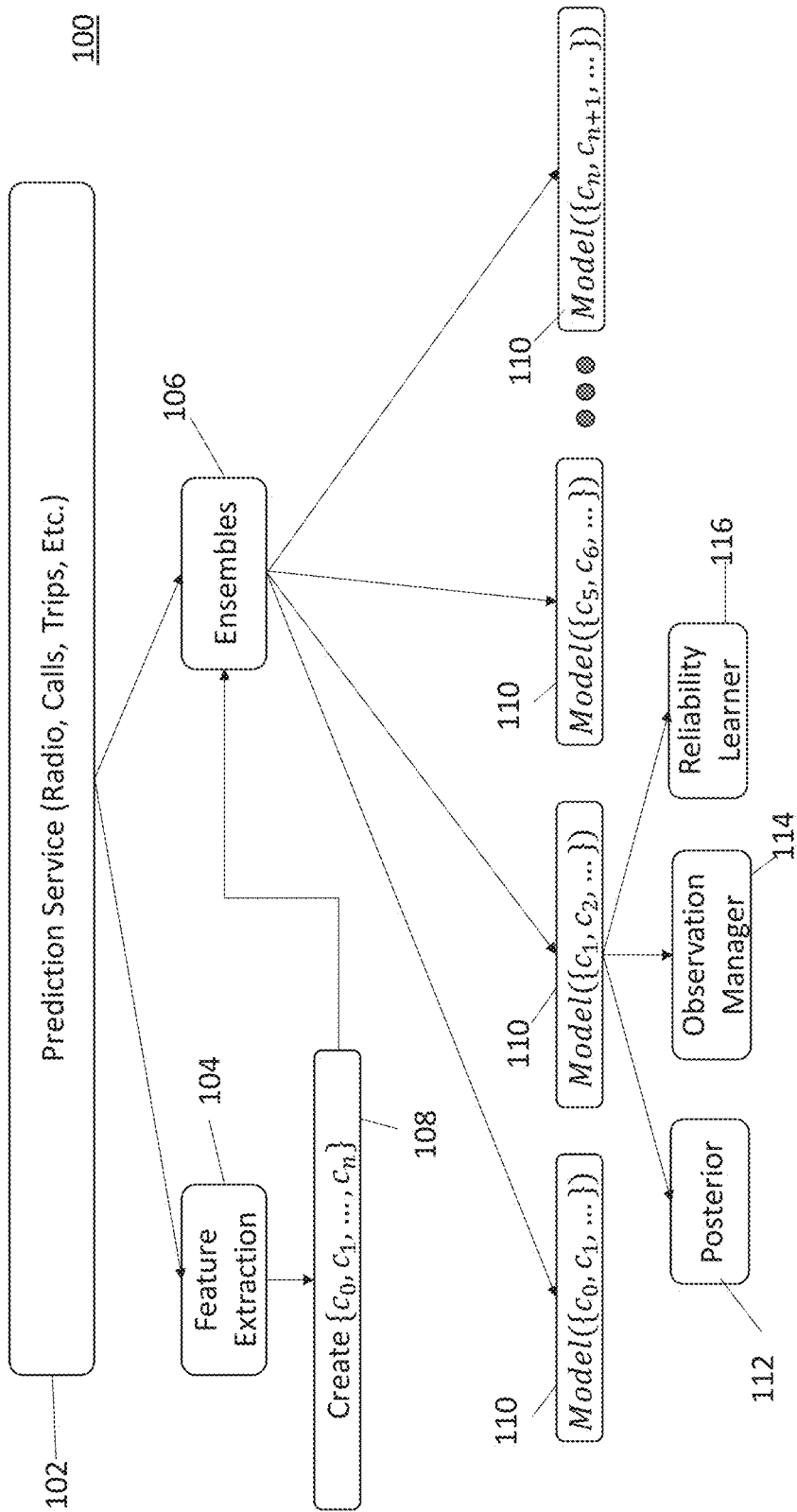
FIG. 1B is a diagram of a process to predict user action according to an embodiment.

FIG. 1B is a schematic diagram of a system 100 to predict a user interface action according to an embodiment. In one example, system 100 may be implemented in electronic computing device 18 of motor vehicle 10. Such an electronic computing device 18 may be embedded in motor vehicle 10 as an electronic control unit (ECU) and/or telematics control unit (TCU) to implement processes described herein (e.g., according to FIGS. 1B through 9) based on computer-readable instructions stored on one or memory devices. According to embodiment, system 100 may develop and/or refine models 110 based, at least in part, on events and/or conditions 102. Events and/or conditions 102 may include, for example, specific user interface actions taken by a driver and/or passenger (e.g., in connection with entertainment, navigation, communication or environment control functions) and a "context" that is contemporaneous with such specific user interface actions taken. Such a context may be characterized by one or more context attributes such as, for example, time of day, day of week, location, just to provide a few examples of context attributes that may characterize a context to be contemporaneous with a user interface action.

According to an embodiment, ensembles 106 may create and/or update models 110 based, at least in part, context features 108 extracted by feature extractor 104 from events and/or conditions 102. In one particular implementation, models 110 may be associated with different context attributes to be used in computing a posterior probability 112.

In one example implementation, models 110 may be used to predict a subsequent user interface action a to be taken by a user such as, for example, selection of a particular radio station (e.g., a:="99.5 FM"), selection of a particular party to whom a phone call is to be placed (e.g., a:="call mom") or selection of a street address for a navigation route (e.g., a:="309 N Pastoria Ave"). According to an embodiment, models 110 (to predict a subsequent user interface action a) may be created and/or updated to predict a based, at least in part, on actions taken by a driver and/or passenger in the past, and contexts present while those actions had been taken.

According to an embodiment, feature extractor 104 may extract context features c from a raw context rc obtained from conditions and/or events 102 according to expression (1) as follows:

$$c:=\text{extract features}(rc). \tag{1}$$

In a particular example, in which rc:=(latitude, longitude, unix time), feature extractor 104 may determine extracted features c according expression (1) to be c:={time of day (TOD), day of week (DOTW), grid location (LAT, LON)}. According to an embodiment, for a target set of possible/available user interface actions $a_0, a_1, \ldots,$ an, a prediction model may compute probabilities that a driver and/or passenger may take the associated user interface actions to be expressed as $(a_0, \text{pr}(a_0\kappa)), (a_1, \text{pr}(a_1/c)), \ldots, (a_n, \text{pr}(a_n/c))$.

Figure 2:
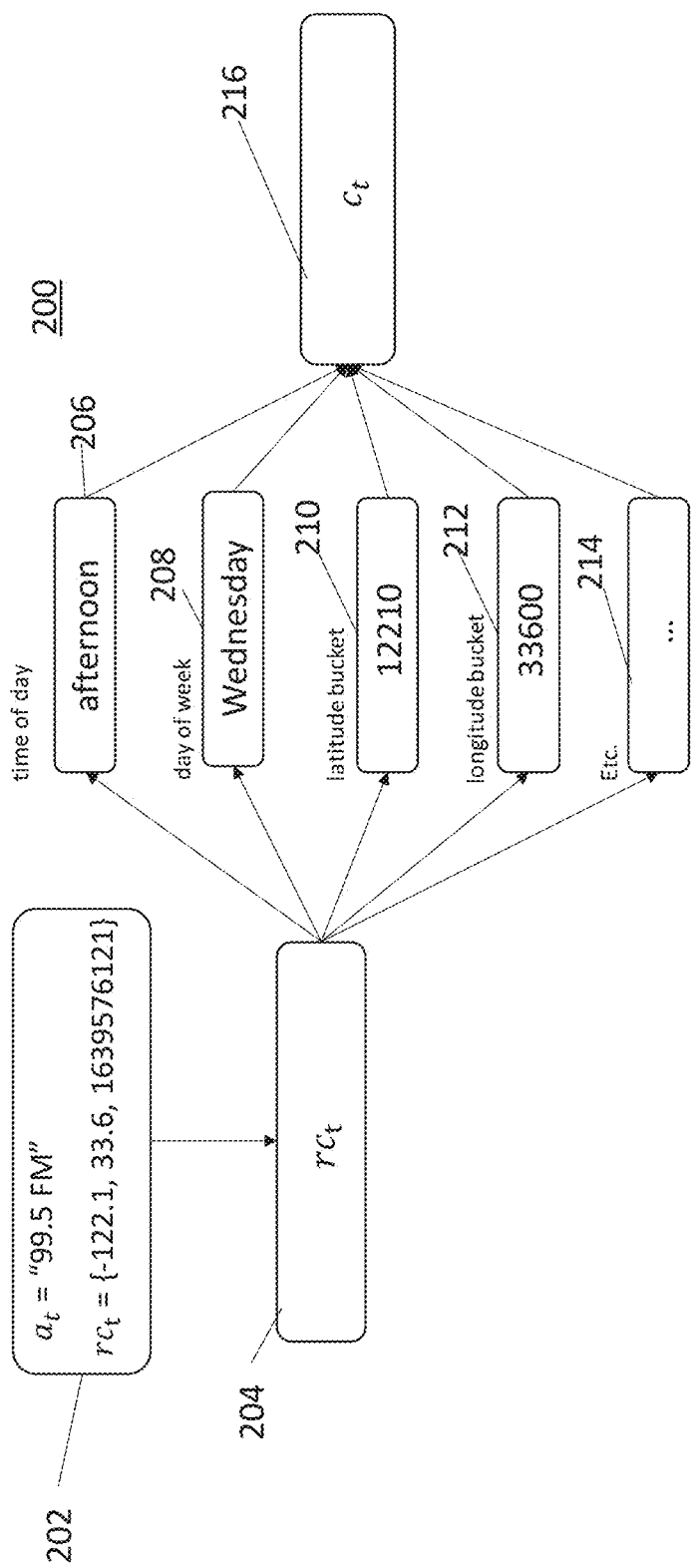
FIG. 2 is a schematic diagram of a system to be implemented in a computing device of a motor vehicle to extract context features, according to an embodiment.

FIG. 2 is a schematic diagram of a system 200 to extract context features 216 from events and/or conditions 202 (such as by feature extractor 104), according to an embodiment. A raw context and detected action 202 may contain raw context $rc_t$ and action at. Raw context $rc_t$ may be further parsed and/or bucketized between and/or among "buckets" for context attributes 206, 208, 210, 212 and 214. Time context features may be further extracted at buckets for context attributes 206 and 208 for time of day and day of week. Location context features may be further extracted at buckets for context attributes 210 and 212 into step sizes of 0.01.

Figure 3:
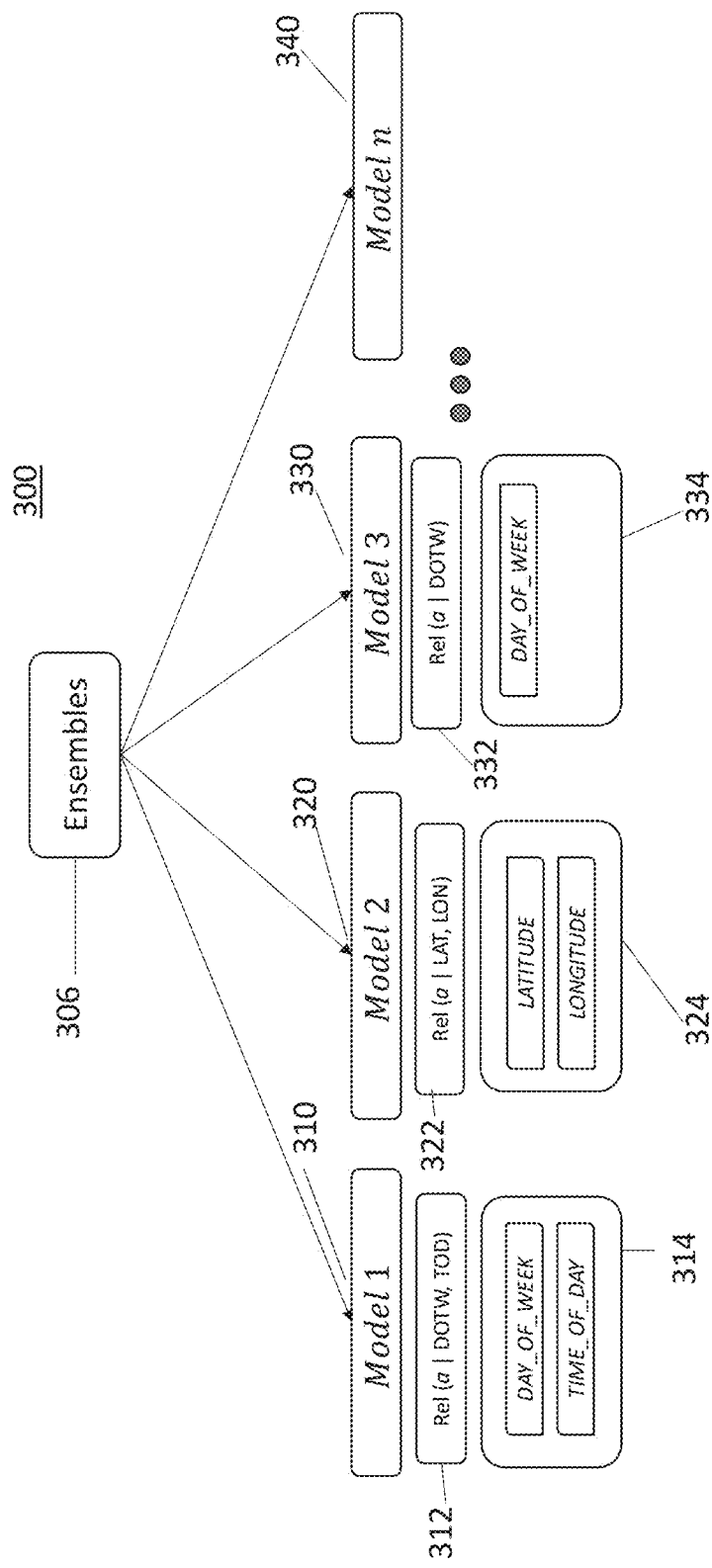
FIG. 3 is a schematic diagram of a system to be implemented in a computing device of a motor vehicle to develop models for relating extracted context features to user interface actions, according to an embodiment.

FIG. 3 is a schematic diagram of a system 300 to create and/or update models for relating extracted context features, such as context features extracted by feature extractor 204, to user interface actions, according to an embodiment. According to an embodiment, an associated ensembles 306 may be instantiated for each type of application, service and/or function (e.g., entertainment/media, phone calls/communication and navigation trips). An ensembles 306 (e.g., for a particular service and/or function) may combine predictions from a group of multiple models 310, 320, 330 and 340 associated with different subsets of extracted context features (e.g., associated with different context attributes such as time of day, day of week, location, etc., as shown). In a particular implementation, models 310, 320, 330 and 340 may further weight predictions of subsequent user actions based, at least in part, on an assessed reliability. Reliability weights 312, 322 and 332 may be determined based, at least in part, on an assessed accuracy of a past predictions of user interface actions. In the particular example of system 300, reliability weights 312, 322 and 332 may reflect a reliability of predicting a particular associated user interface action a conditioned on extracted context features relating respectively to time at model 310 (e.g., day of week and time of day), location at model 320 (e.g., latitude and longitude) and time at model 330 (e.g., day of week). In the particular example illustrated in FIG. 3, repetition of "DAY_OF_WEEK" repeated at 314 and 334 should be understood to be characterizing contexts for two different models. According to an embodiment, ensembles 306 may combine contributions from models 310 320, 330 and 340 to optimize an overall prediction a for a particular associated service.

Figure 4:
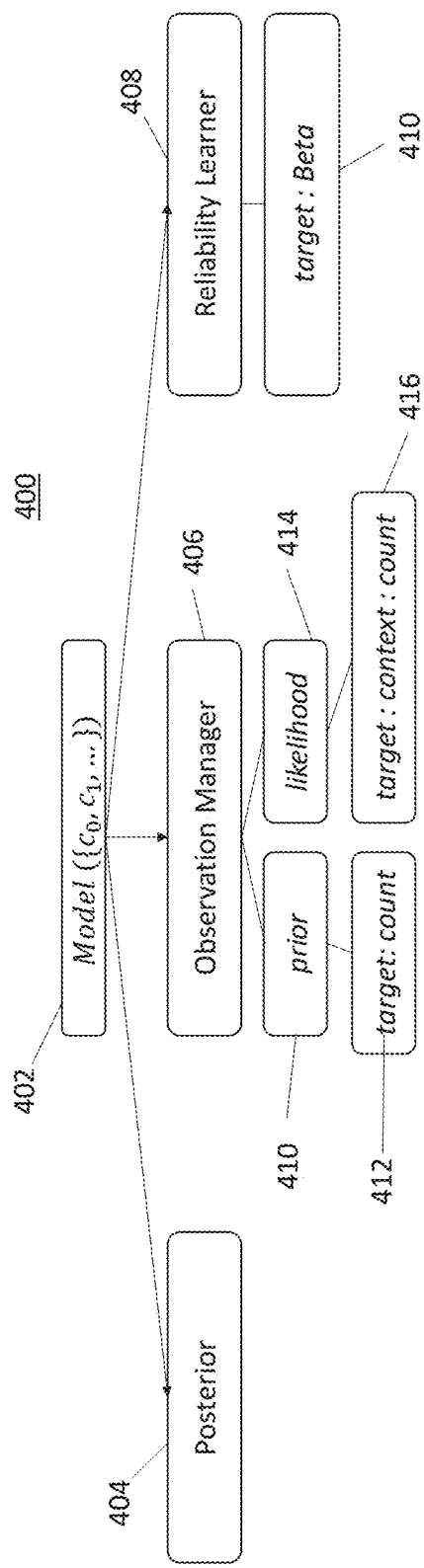
FIG. 4 is a schematic diagram of a system to be implemented at least in part in a computing device of a motor vehicle to apply models to extracted features for computing and/or predicting probabilities of user actions from among a plurality of available user interface actions, according to an embodiment.

FIG. 4 is a schematic diagram of a system 400 to apply models to extracted features for computing probabilities of user interface actions from among a plurality of available user interface actions, according to an embodiment. According to an embodiment, system 400 may be implemented in computing device 18 of motor vehicle 10. Model 402 may comprise one or more features of a model 310, 320, 330 and/or 340 shown in FIG. 3, for example. Model 402 may produce an expression of conditional probability Pr(a/c) (e.g., probability of user to perform a user interface action a in the presence of context c) at block 404 based, at least in part, on computations by observation manager 406. For example, observation manager 406 may compute a prior 410 and likelihood 414 for action a in a given context. Prior 410 may be computed based on target actions 412 (e.g., by adding a constant value to its weight at instances of selection of action a by driver/passenger). After updating a weight associated with action a, prior of Pr(a) may be computed. Here, observation manager 406 may observe actions (e.g., particular enumerated user interface actions) taken by a driver and/or passenger to update weights for each available user interface action to generate probabilities based on prior user interface actions.

Observation manager 406 may also compute a likelihood 414 that is conditional probability Pr(c/a) (e.g., probability of context c contemporaneous with a driver and/or passenger to perform user interface action a) based, at least in part, on context count 416, by adding a constant value to a weight associated with the context where action a at instances in which action a takes place. Here, observation manager 406 may observe contexts contemporaneous with occurrences of available user interface actions to update weights for the observed contexts given the user interface action to generate likelihoods of occurrences of such contexts contemporaneous with the available user interface action. Based, at least in part, on Pr(a) and Pr(c/a) computed by observation manager 406, block 404 may apply Bayes rule to compute Pr(a/c). Additionally, reliability learner 408 may store beta distribution parameters for each available user interface action, and update such beta distribution parameters depending, at least in part, on whether associated user interface actions were predicted accurately by model 402, and return a mean of distribution of β parameters as a reliability weight of model 402 for that target action. Observation manager 406 may also compute a likelihood 414 that is a conditional probability Pr(c/a) (e.g., probability of context c contemporaneous with a driver and/or passenger to perform user interface action a) based, at least in part, on the context count 416, by adding a constant value each time to the weight associated with the context where action a has taken place.

According to an embodiment, observation manager 406 may model conjugate weights based, at least in part, on a Dirichlet distribution: Dir(k,a) for k categorical observations. In a particular implementation, observation manager 406 may employ a least recently used (LRU) cache with limited capacity to keep track of recent observations with associated Dirichlet weights. Such an LRU cache may discard a least recently used item according to expression (2) as follows:

$$\mathrm{LRU}=\{(c_i,a_i),(c_j,a_j),(c_k,a_k),\ldots,(c_m,a_m),(c_n,a_n)\}, \quad (2)$$

where:
$c_i$ is an earliest context observation;
$a_i$ is a Dirichlet weight to be applied for $c_i$;
$c_n$ is a latest context observation; and
$a_n$ is a Dirichlet weight to be applied for $c_n$.

According to an embodiment, a decay rate y may be applied to discount past driver and/or passenger behaviors and emphasize most recent driver and/or passenger behaviors. In an example of expression (2), letting $c_p$ be a context observation while an LRU cache of observation manager 406 is at capacity, if an item for $c_p$ already exists in the LRU cache, an associated Dirichlet weight may be updated as $a_p \rightarrow y\ a_p + a$, where $0 < a < 1$. If $c_p$ is a new item, then $(c_i, a_i)$ may be discarded from the LRU cache. Weights of all other items may then be discounted by multiplying them by decay rate y: $a_j \rightarrow y\ a_j$. A new Dirichlet weight may be assigned to $c_p$ based, at least in part, on a prior Dirichlet weight $a_0 \rightarrow a_p$. Contents of an LRU cache may then be updated as shown in expression (3) as follows:

$$\mathrm{LRU}=\{(c_j,a_j),(c_k,a_k),\ldots,(c_m,a_m),(c_n,a_n),(c_p,a_p)\}. \quad (3)$$

Figure 5:
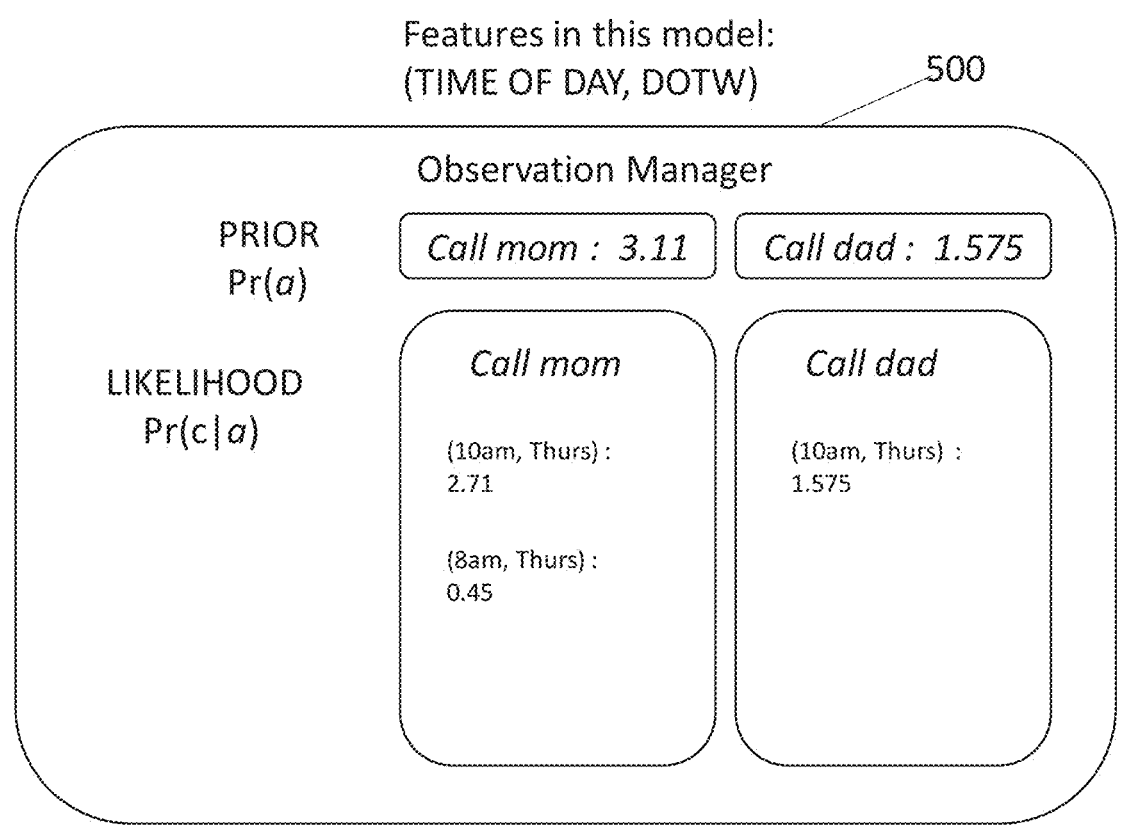

FIG. 5 is a schematic diagram of an observation manager 500 applied to a scenario according to an embodiment of observation manager 406 (FIG. 4), for example. To determine Pr(a) based, at least in part, on prior observations, observation manager 500 may observe each user interface action qualifying as an available user interface action a (e.g., among an enumerated set of available user interface actions), update an associated weight a, and discount weights in an LRU cache associated with other target actions. A prior LRU cache may list all recent user interface actions and corresponding weights. In the particular example of FIG. 5, observation manager 500 identifies user interface actions "Call mom" and "Call dad." Observation manager 500 may observe "Call mom" event once at 8 am on Thursdays and five times at 10 am on Thursdays, providing an associated weight of 3.11 for event "Call mom." Observation manager 500 may also observe "Call dad" three times at 10 am on Thursdays, providing an associated weight of 1.575 for event "Call dad."

Observation manager 500 may further comprise a likelihood observer to, for each observation of an available user interface action, further observe a contemporaneous context $c_O$ and update an associated weight $a_O$ of that contemporaneous context in an LRU cache. Observation manager 500 may also discount Dirichlet weights α for contexts associated with other (e.g., past) observations of the user interface action in the LRU cache. According to an embodiment, observation manager 500 may maintain one likelihood LRU cache for each available user interface action. Entries in the LRU cache may list contexts associated with all recent observations of the user interface action and weights corresponding to the contexts associated with the recent observations of that available user interface action. FIG. 6 shows an example computation of likelihood weights for contexts associated with observations of user interface actions "Call mom" and "Call dad" based on observations of user interface actions with an initialized prior weight $a_p$ of 0.1. A Dirichlet weight a is initialized at/to 0.75 and a decay y is initialized at/to 0.9. Here, values of Pr(a) are computed to be 3.11 and 1.575 for user interface actions "Call mom" and "Call dad," respectively.

According to an embodiment, for a given context c, block 404 (FIG. 4) may generate conditional a posteriori probability Pr(a/c) for each available user interface action a. Given prior values in an LRU cache, for example, weights for each available user interface action a may be normalized to obtain an associated Pr(a). Pr(c/a)×Pr(a) may be summed across all available user interface actions a to obtain a total probability for context c as Pr(c). Pr(a/c) for a user interface action may then be computed using Bayes rule according to expression (4) as follows:

$$Pr(a/c)=Pr(c/a)\times Pr(a)/Pr(c). \quad (4)$$

In a particular implementation, block 404 may return a list of user interface actions and associated posterior probabilities Pr(a/c) for a given context c. Referring to the particular examples of FIGS. 5 and 6, posterior probability of event "Call mom" in a context of TOD=10 am, DOW=Thursday may be computed according to expression (5) as follows:

$$Pr(\text{call mom}/10 \text{ am, Thurs}) = \frac{Pr(10 \text{ am, Thurs/call mom})Pr(\text{call mom})}{Pr(10 \text{ am, Thurs/call dad})Pr(\text{call dad}) + Pr(10 \text{ am, Thurs/call mom})Pr(\text{call mom})} \quad (5)$$

According to an embodiment, predictions of a particular user interface action generated by different models may be combined by averaging. Different models for predicting an instance of a particular user interface action, however, may have different associated levels of accuracy and/or reliability. As such, simply averaging likelihood predictions of an instance of a particular user interface action based on different models may be skewed by likelihood predictions generated by relatively less reliable and/or less accurate models. In other words, averaging likelihood predictions of an instance of a particular user interface action from different models having different associated accuracies may yield an overall low performing model to predict the instance of the particular user interface action.

According to an embodiment, reliability learner 408 may facilitate assessments of reliability of models used for predicting an instance of a particular user interface action. Such assessments of reliability of models may be based, at least in part, on past predictions made by those models when the particular user interface action was observed/detected. Based, at least in part, on such assessments of reliability, likelihood predictions of different context models for a particular user interface action a may be weighted and combined for determining an overall likelihood prediction for user interface action a.

According to an embodiment, an ability of a model m (e.g., model 402) to predict a particular user interface action a may be modeled as a random variable according to expression (6) as follows:

$$\partial_{m,a} \sim \text{Beta}(a,p). \quad (6)$$

According to an embodiment, parameter α in expression (6) may be increased according to expression (7) on instances in which model m correctly predicts enumerated target action a while β may be increased otherwise according to expression (8).

$$a := ya + 8_{a=pred} \quad (7)$$

$$p := yp + 8_{a*pred} \quad (8)$$

In expressions (7) and (8), $8_{a=pred}$ and $8_{a*pred}$ are increments to be applied if target action a is correctly predicted and incorrectly predicted, respectively. On instances when model m makes a prediction (correctly or incorrectly), both parameters a and p may be discounted by decay rate y (e.g., to discount past behaviors), and add an update directly. In a particular implementation, an LRU cache implemented in a reliability learner (e.g., reliability learner 408) may have sufficient capacity to store parameters of each of multiple models and associated beta distribution parameters (e.g., α and p of expression (6)). In an implementation, an LRU cache may be used to store results of a reliability learner as set forth in expressions (2) and (3). For an LRU cache set forth in expression (3), individual elements in the LRU cache may have a tuple of an associated model and its p distribution parameters are updated with every prediction. Such an LRU cache may also have a capacity that is large enough to accommodate a large number of models. By taking a mean of p distribution parameters, a reliability weight of model m may be quantified according to expression (9) as follows:

$$Rel(m, a) = \frac{a}{a+p} \quad (9)$$

Figure 7:
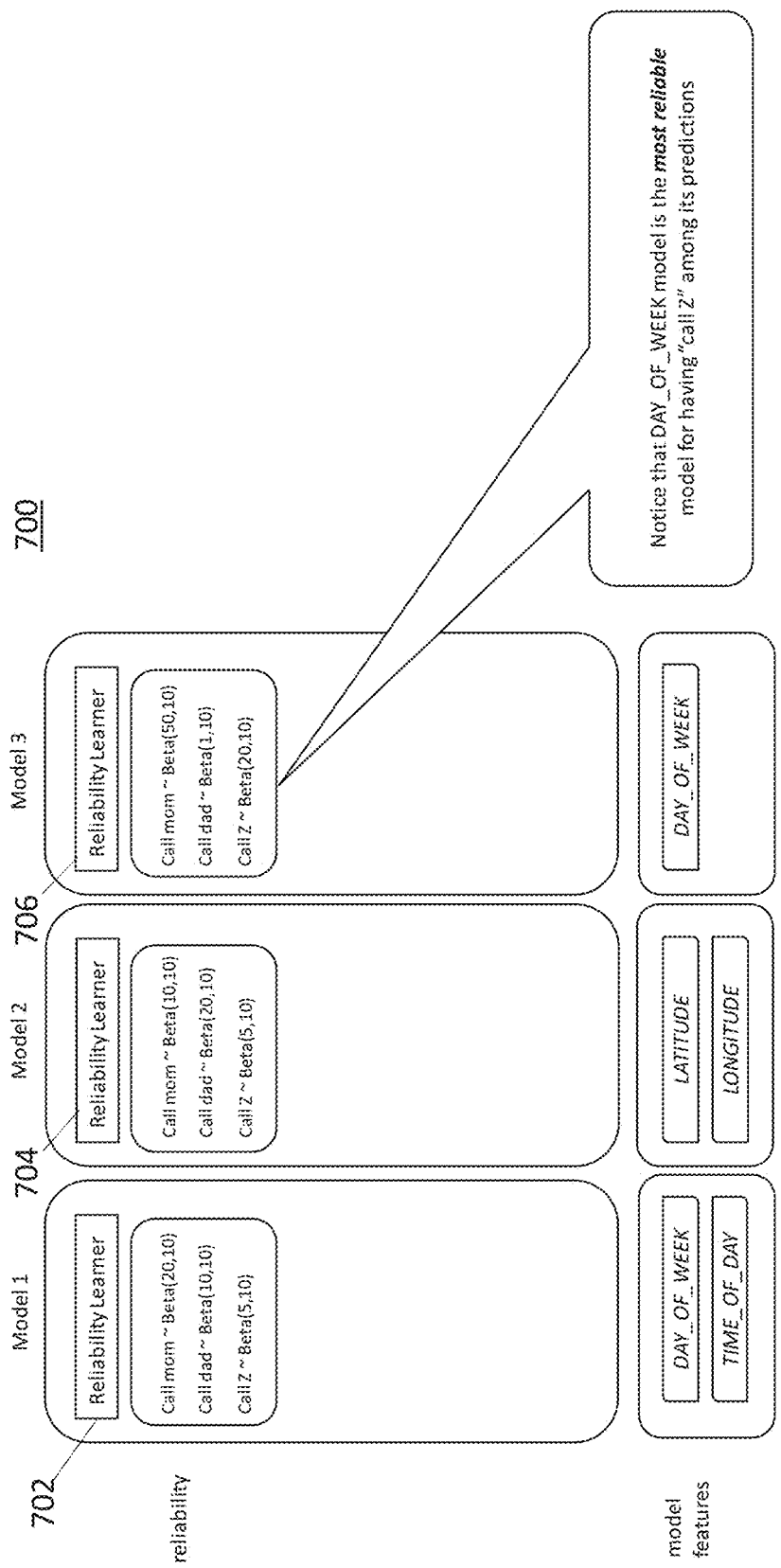

FIG. 7 is a schematic diagram of example computation of reliability weights for associated models, according to an embodiment. For example, for each of the established models 702, 704 and 706, a reliability weight may be computed. In the particular example of FIG. 7, models 1, 2 and 3 may be capable of predicting user interface actions "Call mom," "Call dad" and "Call Z." Models 1, 2 and 3 may predict actions based on context attributes Day_of_Week/Time_of_Day, latitude/longitude and Day_of_Week, respectively. In the particular illustrated example, an associated detected actual observed vehicle user interface actions may be "Call Z" while model 1 predicts "Call mom," model 2 predicts "Call dad" and model 3 predicts "Call Z" and "Call mom." Since "Call Z" is among predictions by model 3, reliability learner 706 associated with model 3 may add to an associated parameter α for model 3. For models 1 and 2, associated reliability learner 702 and reliability learner 704 may add to associated parameters p since models 1 and 2 did not predict occurrence of "call Z" accurately. A final reliability weight/parameter for models 1, 2 and 3 may be quantified as a mean beta distribution for associated models 1, 2 and 3. In this particular example, it should be noted that "call Z" is the correct target action that was actually taken by a user, and that a positive weight of a is increased for model 3 by reliability learner 706 since the correctly predicted "call Z" is among predictions for model 3. Since "call Z" is not among predictions by other models 1 and 2, associated negative weights β are increased.

Figure 8:
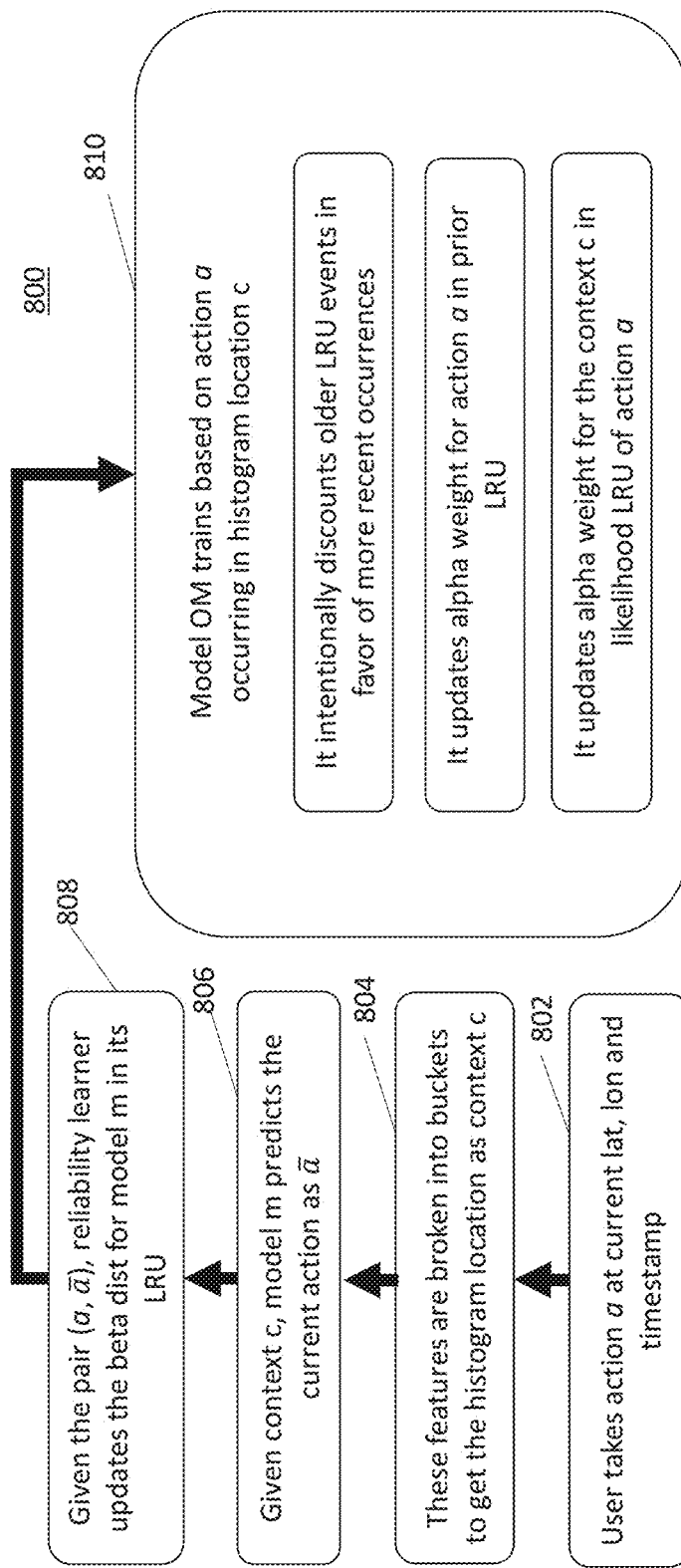
FIG. 8 is a flow diagram of a machine-learning training process, according to an embodiment.

FIG. 8 is a flow diagram of a machine-learning training process 800, according to an embodiment. Block 802 may comprise obtaining observations of events and/or conditions 102 or 202 including, for example, an observed user interface action and/or an associated raw context from which context features may be extracted (e.g., at feature extractor 104). Block 804 may comprise bucketizing extracted context features according to particular context attributes (e.g., context attributes 206, 208, 210, 212 and 214). Block 806 may comprise making a prediction a of a particular user interface action based, at least in part, on application of context features bucketized at block 804 to a model m, such as application of extracted and bucketized features to model 402, for example. Based, at least in part, on prediction a of a particular use interface action and an associated detected actual observed vehicle user interface action, block 808 may update one or more reliability weights associated with model m. For example, block 808 may apply reliability learner 408 to determine an updated reliability weight to be associated with model m according to expression (9). At block 810, an observation manager may be trained based on action a taking place in context c by updating weights α associated with action a in a prior LRU cache and for context c in a likelihood LRU cache specific for action a, after discounting older LRU events (e.g., according to expression (3)).

Figure 9:
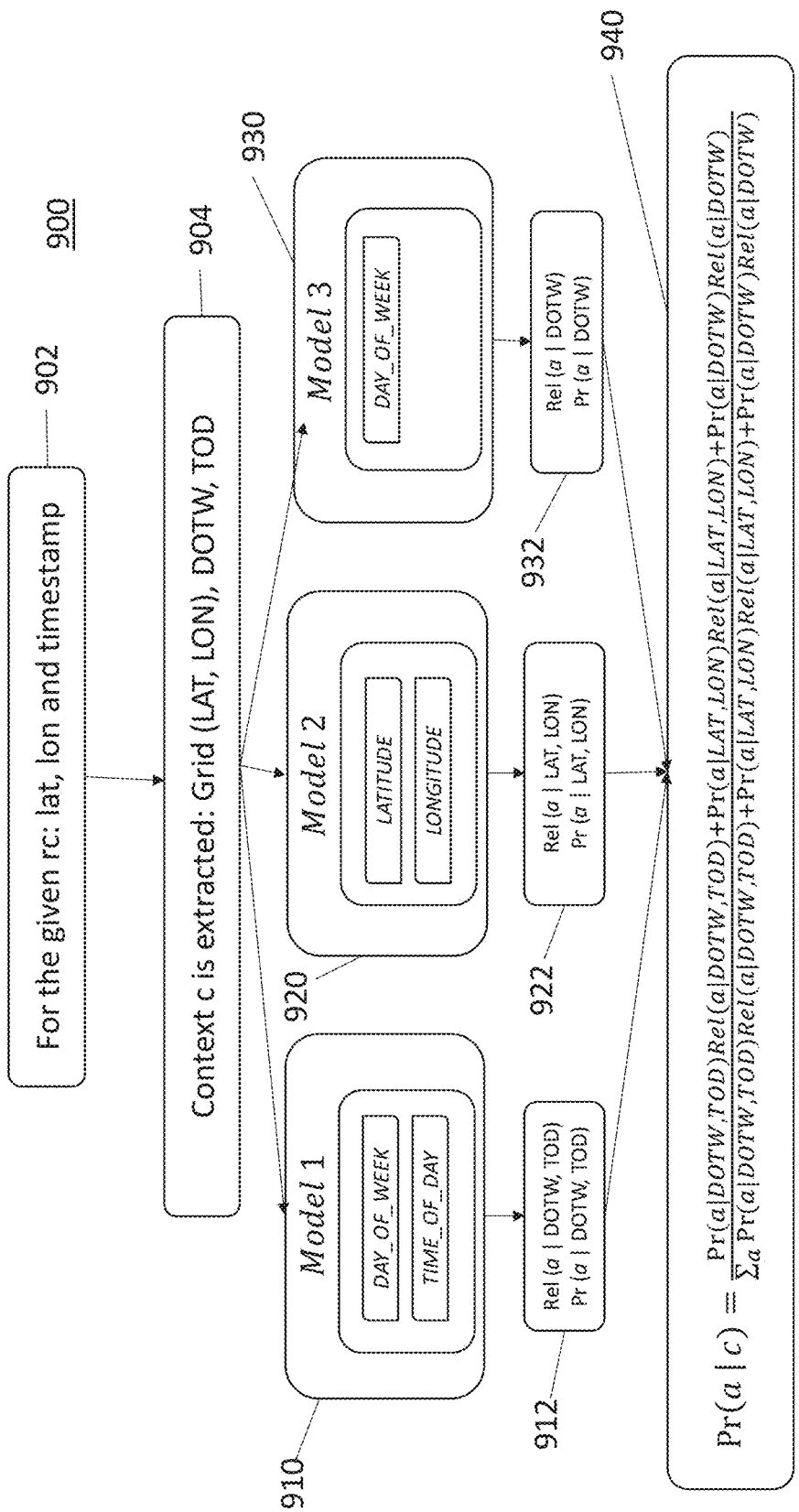
FIG. 9 illustrates a computation of a probability of a user to perform a particular user interface action conditioned on extracted context features, according to an embodiment.

FIG. 9 illustrates a computation of a probability of a user to perform a particular action conditioned on extracted contemporaneous context features, according to an embodiment. Process 900 may compute a probability and/or likelihood 940 as a prediction of an occurrence of a particular user interface action in the presence of a particular context. In a particular implementation, probability and/or likelihood 940 may be computed based, at least in part, on models 910, 920 and 930 trained and/or updated according to process 800, for example. Observations of a current raw context 902 may be processed at block 904 to extract features of the current context (e.g., using feature extractor 104). Extracted context features may be further bucketized according to feature attributes (e.g., as shown in FIG. 2) for application to models 910, 920 and 930.

As shown, models 910, 920 and 930 may be adapted to compute probabilities/likelihoods conditioned on particular context attributes of a current context. For example, model 910 may compute a probability/likelihood of an occurrence of a particular action conditioned on day of week and/or time of day, model 920 may compute a probability/likelihood of an occurrence of the particular action conditioned on location, and model 930 may compute a probability/likelihood of an occurrence of the particular action conditioned on day of week only. Such posterior probabilities conditioned on individual context attributes may be computed individually for each of model 910, 920 and 930 by application of Bayes rule (e.g., by block 404), for example, to be paired with associated reliability weights (e.g., computed according to expression (9)) at blocks 912, 922 and 932. Probability and/or likelihood 940 may then be computed as an overall probability/likelihood of a user action based on the current context according to expression (10).

$$Pr(a/c) = \frac{Pr(a/DOTW, TOD)Rel(a/DOTW, TOD) + Pr(a/LAT, LON)Rel(a/LAT, LON) + Pr(a/DOTW)Rel(a/DOTW)}{\sum_a Pr(a/DOTW, TOD)Rel(a/DOTW, TOD) + Pr(a/LAT, LON)Rel(a/LAT, LON) + Pr(a/DOTW)Rel(a/DOTW)}. \quad (10)$$

Thus, a denominator of expression (10) may be determined based, at least in part, by summing computed probabilities of features indicative of a contemporaneous context conditioned on a plurality of available vehicle user interface actions to determine summed computed probabilities. In other words, expression (10) may sum computed probabilities of features indicative of one or more contexts. A predicted probability Pr(a/c) as determined in expression (10) may be computed based, at least in part, on established models weighted according to computed reliability weights. In a particular non-limiting example application of process 900, models 910, 920 and 930 may be updated (e.g., from ensembles 306) when a driver and/or passenger initiates user interface action "calls mom" at 9 am on Wednesday while in the user's driveway (e.g., Lat=−122.1, Long=33.6). Context features for time of day, day of week, latitude and longitude may be extracted as morning, Wednesday, −12210 and 3360, respectively. Parameters of models 910, 920 and 930 may then be updated (e.g., by applying ensembles 306). At a future time to predict a called party for a subsequent call, models 910, 920 and 930 may determine associated computed posterior probabilities based, at least in part, on features extracted from a context in the future time to be combined at block 940 to compute a probability that target action "call mom" is to occur.

Figure 10:
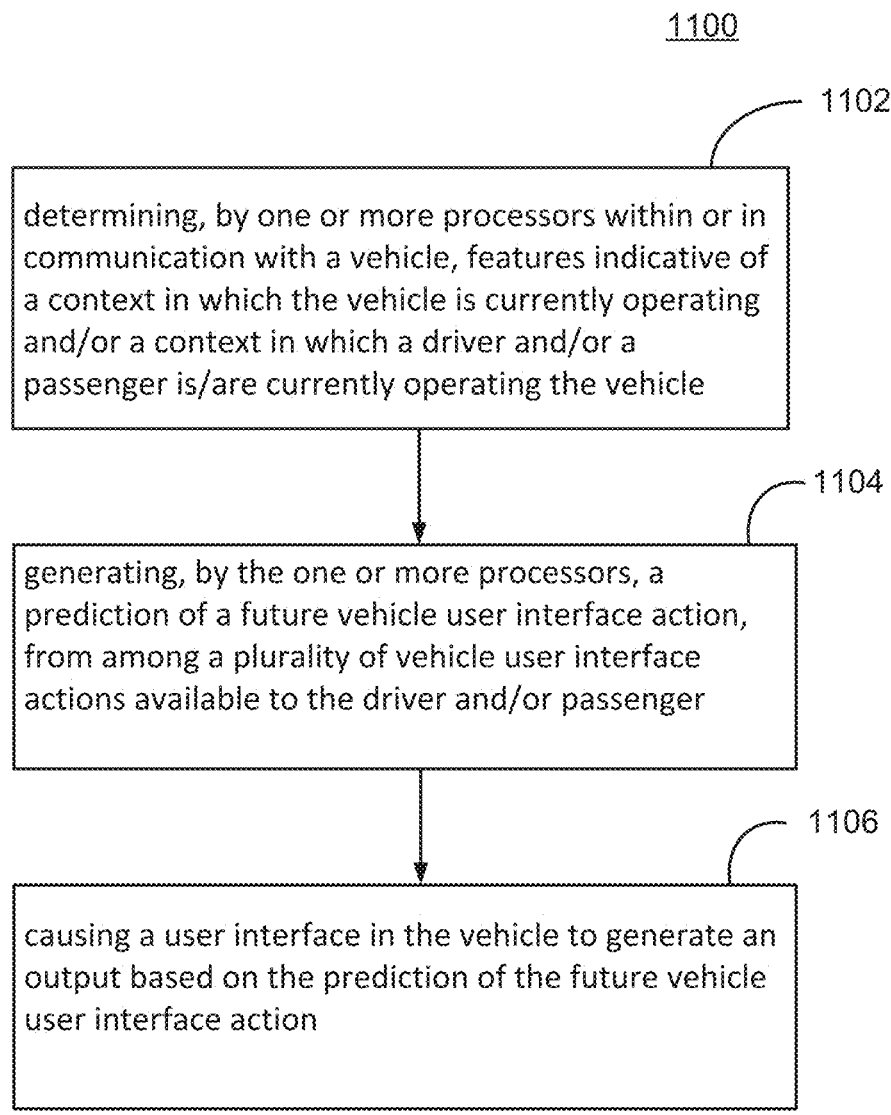
FIG. 10 is a flow diagram of a process to predict a subsequent user interface action, according to an embodiment.

FIG. 10 is a flow diagram of a process 1100 to determine service codes based on an electronic document, according to an embodiment. Block 1102 may comprise a determination of features indicative of a contemporaneous context. A "context" as referred to herein should be understood to mean a "circumstance" or "situation" that may be indicative of and/or may affect selection preference by a driver and/or passenger. Block 1102 may obtain features indicative of the contemporaneous context as extracted by system 200 (FIG. 2). As described herein, such features of a context (e.g., time of day, day of week, location, etc.) may be predictive of selection preferences of a driver and/or passenger. It should be understood, however, that these are merely examples of context attributes that may characterize a contemporaneous context, and claimed subject matter is not limited in this respect.

Block 1104 may comprise determining a predicted future vehicle user interface action (e.g., selection of an entertainment option, called party and/or climate control options) from among a plurality of available interface actions. In a particular implementation, such available interface actions may be enumerated as available vehicle user interface actions as discussed above. According to an embodiment, block 1104 may predict a future vehicle user interface action according to a posterior probability Pr(a/c) computed according to a Bayes model as shown in FIG. 9 at block 940. For example, block 1104 may comprise generating such computed posterior probabilities based, at least in part, on features indicative of a contemporaneous context as extracted at block 1102. Block 1104 may further base computation of such a posterior probability based on application of features extracted at block 1102 to user action context parameters, such as user action context parameters implemented in models 910, 920 and/or 930, for example. In an embodiment, a user action context parameter may be a parameter which describes a context in which a user action occurred. For example, such user action context parameters may relate (i) at least one past vehicle user interface action requested by at least one past driver and/or past passenger of an associated vehicle, and (ii) determined features of an observed past context (e.g., time of day, day of week, location) in which the associated vehicle was operating and/or in which the at least one past driver and/or past passenger was/were operating the associated vehicle contemporaneous with the at least one past driver and/or past passenger requesting the at least one past vehicle user interface action. As pointed out above, parameters defining models 910, 920 and/or 930 may be based, at least in part, on past vehicle user interface actions requested by at least one driver and/or passenger (e.g., at least one past driver and/or past passenger of an associated vehicle). For example, parameters defining models 910, 920 and/or 930 may be determined by one or more ensembles operations such as ensembles 306 (FIG. 3).

Block 1106 may comprise providing signals to a user interface to present options to a driver and/or passenger based, at least in part, on one or more predictions determined at block 1104. For example, block 1106 may cause an output device (e.g., visual or audio output device) to present one or more selectable options based, at least in part, on the predictions determined at block 1104.

In some scenarios, dynamic conditions may affect and/or change a particular context that is a basis for a prediction determined at block 1104. As such, process 1100 may generate an updated prediction based, at least in part, on updated parameters reflecting such a change in context. According to an embodiment, following generation of a prediction at block 1104, process 1100 may collect and/or receive updated features indicative of the context in which the vehicle is currently operating and/or the context in which the vehicle is currently operating and/or the context in which the driver and/or passenger is/are currently operating the vehicle. Additionally, process 1100 may further determine whether a predetermined amount of time has elapsed since a prediction was generated at block 1104 (e.g., ten seconds). Responsive to such a determination that the predetermined amount of time has elapsed, an update of the prediction of the future vehicle interface action may be generated. Signals may then be provided to the user interface to present an update of options to a driver and/or passenger based, at least in part, on the updated predictions. For example, such signals may cause an output device (e.g., visual or audio output device) to present one or more selectable updated options based, at least in part, on the updated prediction.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

The terms "correspond", "reference", "associate", and/or similar terms relate to signals, signal samples and/or states, e.g., components of a signal measurement vector, which may be stored in memory and/or employed with operations to generate results, depending, at least in part, on the abovementioned, signal samples and/or signal sample states. For example, a signal sample measurement vector may be stored in a memory location and further referenced wherein such a reference may be embodied and/or described as a stored relationship. A stored relationship may be employed by associating (e.g., relating) one or more memory addresses to one or another memory addresses, for example, and may facilitate an operation, involving, at least in part, a combination of signal samples and/or states stored in memory, such as for processing by a processor and/or similar device, for example. Thus, in a particular context, "associating," "referencing," and/or "corresponding" may, for example, refer to an executable process of accessing memory contents of two or more memory locations, e.g., to facilitate execution of one or more operations among signal samples and/or states, wherein one or more results of the one or more operations may likewise be employed for additional processing, such as in other operations, or may be stored in the same or other memory locations, as may, for example, be directed by executable instructions. Furthermore, terms "fetching" and "reading" or "storing" and "writing" are to be understood as interchangeable terms for the respective operations, e.g., a result may be fetched (or read) from a memory location; likewise, a result may be stored in (or written to) a memory location.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Figure 11:
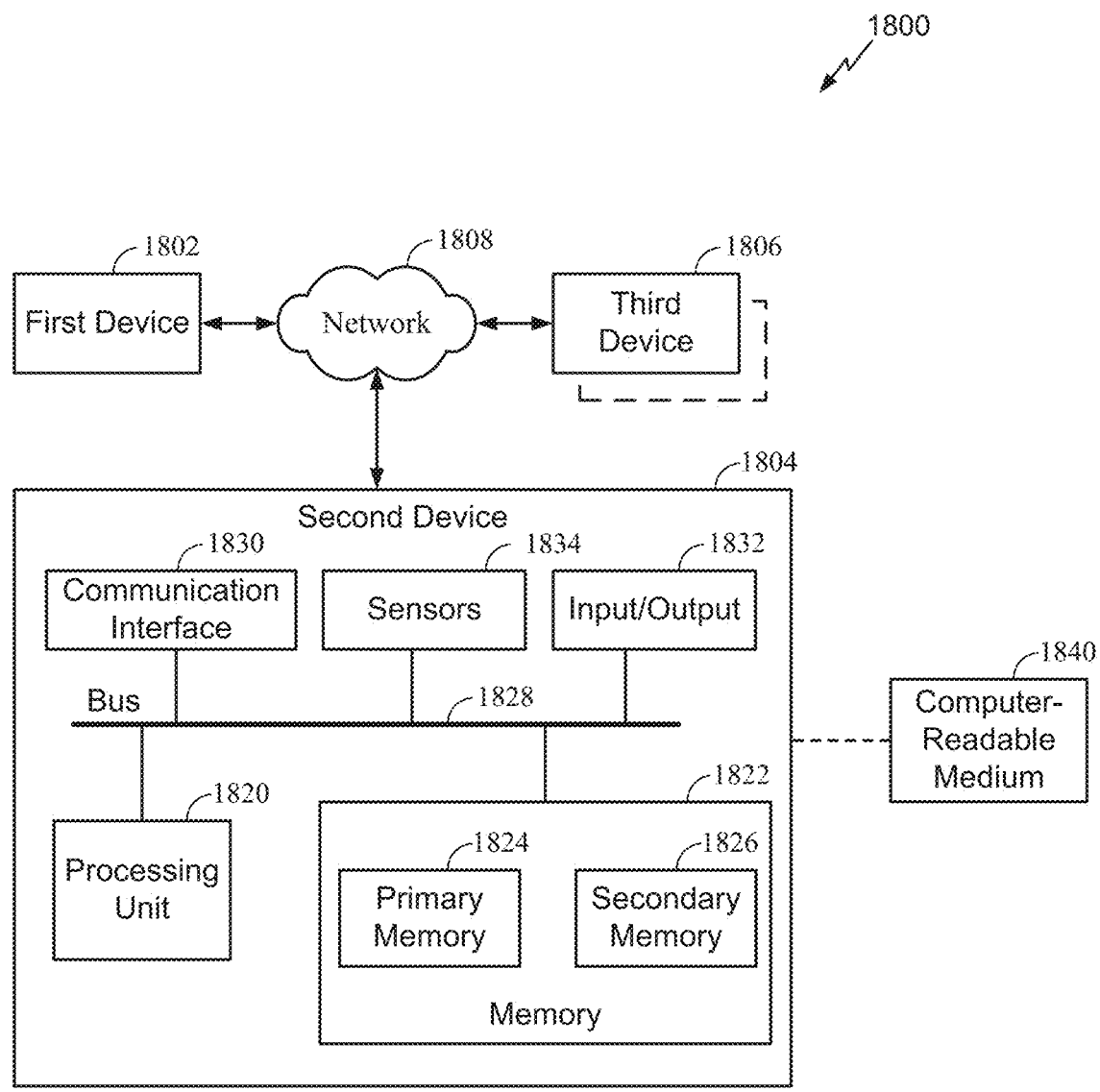
FIG. 11 is a schematic block diagram of an example computing system in accordance with an implementation.

In one example embodiment, as shown in FIG. 11, network 1808 may comprise one or more network connections, links, processes, services, applications, and/or resources to facilitate and/or support communications, such as an exchange of communication signals, for example, between a computing device, such as first computing device 1802, and another computing device, such as third computing device 1806, which may, for example, comprise one or more client computing devices, embedded computing devices and/or one or more server computing device. By way of example, but not limitation, computing devices 1802, 1804 and 1806 may comprise an electronic control unit (ECU), motor control unit (MCU), hybrid control unit (HCU), head unit, telematics control unit (TCU), just to provide a few examples. Additionally by way of example, but not limitation, network 1808 may comprise wireless and/or wired communication links or signaling buses, or any combinations thereof, to facilitate communication between and/or among embedded devices.

According to an embodiment, electronic computing device 18 (FIG. 1A) may be implemented, at least in part, by features of second computing device 1804. As such, second computing device 1804 may be integrated with a motor vehicle (e.g., as electronic computing device 18) to execute a UAP model that controls portions of a user interface of motor vehicle 10. In an implementation, second computing device 1804 may execute instructions stored on computer-readable medium 1840 to execute all or portions of process 900 to determine a probability and/or likelihood 940 as a prediction of an occurrence of a particular user interface action in the presence of a particular context. In one particular implementation, parameters of an inference model to execute process 900 (e.g., to determine a probability and/or likelihood 940) may be determined from execution of process 800 from execution of instructions stored on computer-readable medium 1840 by second computing device 1804. Here, process 800 may be executed based, at least in part, on observations of user actions and observations of context (e.g., based, at least in part, on signals generated by sensors 1834), for example.

In another particular implementation, process 900 may be executed by second computing device 1804 (e.g., implementing electronic computing device 18 to determine a probability and/or likelihood 940) while process 800 to train parameters for process 900 may be executed by first computing device 1802 (e.g., implementing a server to be in communication with computing device 18). For example, observations of user actions and contexts may be gathered locally at second computing device 1804 (e.g., at electronic computing device 18 integrated with motor vehicle 10) and transmitted to first computing device 1802 over network 1808. Based, at least in part, on such observations of user actions and contexts received from second computing device 1804, first computing device 1802 may execute process 800 to determine/update parameters of process 900 to be transmitted back to second computing device 1804.

Example devices in FIG. 11 may comprise features, for example, of a client computing device and/or a server computing device, in an embodiment. In a particular implementation, embodiment 1800 of FIG. 11 may be integrated with one or more motor vehicle subsystems such as, for example, entertainment subsystems, environmental control subsystems, communication subsystems, driverless navigation subsystems, just to provide a few examples. For example, portions of embodiment 1800 may be integrated with a "head unit" to perform functions that are controllable by user interface actions by a driver and/or passenger, for example. It is further noted that the term computing device, in general, whether employed as a client and/or as a server, or otherwise, refers at least to a processor and a memory connected by a communication bus. A "processor," for example, is understood to connote a specific structure such as a central processing unit (CPU) of a computing device which may include a control unit and an execution unit. In an aspect, a processor may comprise a device that fetches, interprets and executes instructions to process input signals to provide output signals. As such, in the context of the present patent application at least, computing device and/or processor are understood to refer to sufficient structure within the meaning of 35 USC § 112 (f) so that it is specifically intended that 35 USC § 112 (f) not be implicated by use of the term "computing device," "processor" and/or similar terms; however, if it is determined, for some reason not immediately apparent, that the foregoing understanding cannot stand and that 35 USC § 112 (f), therefore, necessarily is implicated by the use of the term "computing device," "processor" and/or similar terms, then, it is intended, pursuant to that statutory section, that corresponding structure, material and/or acts for performing one or more functions be understood and be interpreted to be described at least in FIGS. 1-10 and in the text associated with the foregoing figure(s) of the present patent application.

Referring now to FIG. 11, in an embodiment, first and third devices 1802 and 1806 may be capable of rendering a graphical user interface (GUI) (e.g., including a pointer device, touchscreen, console button, etc.) for a network device and/or a computing device, for example, so that a user-operator (e.g., vehicle driver and/or passenger) may engage in system use. Such a GUI may be configured to receive and/or respond to user interface actions initiated by a vehicle or passenger, for example. Input/output device 1832 in combination with processes executed by processing unit 1802 may be configured to provide a such a GUI. Sensors 1834 may comprise any one of several type sensors capable of providing a signal indicative of an observation of some physical phenomenon. Sensors 1834 may comprise sensors capable of observing an operational state of a machine such as an operational state of a motor vehicle. Sensors 1834 may also comprise one or more environmental sensors such as, for example, a thermometer, altimeter, light sensor, camera, microphone, radar, just to provide a few examples. Sensors 1834 may comprise signal processing electronics such as, for example, analog filters, samplers, etc., capable of providing a signal indicative of observations to be processed by processes executing on processing unit 1820. In a particular implementation, such signals generated by sensors 1834 may provide observations to furnish raw context $rc_t$ to be bucketized and applied to probability models as discussed above. In embodiment 1800 shown in FIG. 11, computing device 1802 ('first device' in figure) may interface with computing device 1804 ('second device' in figure), which may, for example, also comprise features of a client computing device and/or a server computing device, in an embodiment. Processor (e.g., processing device) 1020 and memory 1822, which may comprise primary memory 1824 and secondary memory 1826, may communicate by way of a communication bus 1815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1804, as depicted in FIG. 11, is merely one example, and claimed subject matter is not limited in scope to this particular example.

As pointed out above, according to an embodiment, electronic computing device 18 (FIG. 1A) may be implemented, at least in part, by features of computing device 1804. As such, second computing device 1804 may implement features of an electronic control unit (ECU), telematics control unit (TCU), head unit, zone controller, domain controller and/or the like embedded in motor vehicle 10, that is configured to execute all or a portion of process 900 (e.g., to determine probability and/or likelihood 940). In one particular implementation, such a device embedded in motor vehicle 10 may also execute process 800 to, at least in part, train parameters of process 900 based, at least in part, on observations of context and/or user actions collected at sensors of motor vehicle 10. In another implementation, parameters of process 900 to be executed by such a device embedded in motor vehicle 10 may be trained by a server device detached from motor vehicle 10 (e.g., first computing device 1802 configured as a server to be in communication with a device embedded in motor vehicle 10 over network 1808).

In one implementation, execution of computer-readable instructions (e.g., stored on computer-readable medium 1840) by processing unit 1820 may, at least in part, implement all or a portion of observation manager 114, 406 and/or 500, ensembles 306, reliability learner 116, process 800 and/or process 900, just to provide a few examples. In another implementation, features of observation manager 114, 406 and/or 500, ensembles 306, reliability learner 116, process 800 and/or process 900 may be shared among multiple computing devices. For example, features of observation manager 114, 406 and/or 500, ensembles 306, reliability learner 116, process 800 and/or process 900 may be implemented in part by execution of computer-readable instructions by computing device 1804 (e.g., where computing device 1804 is to implement computing device 18 in motor vehicle 10) and computing device 1802 (e.g., where computing device 1802 is in a "cloud" server coupled to electronic computing device 18 over network 1808).

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, environmental control systems, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. It is noted, however, that a SIM card may also be electronic, meaning that is may simply be stored in a particular location in memory of the computing and/or networking device. A vehicle driver and/or passenger may operate the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network formed at least in part by a portion of a computing and/or communications network. A computing and/or network device may also include executable computer instructions to process and/or communicate digital content, such as, for example, textual content, digital multimedia content, and/or the like.

In FIG. 11, computing device 1804 may provide one or more sources of executable computer instructions in the form physical states and/or signals (e.g., stored in memory states), for example. Computing device 1802 may communicate with computing device 1804 by way of a network connection, such as via network 1808, for example. As previously mentioned, a connection, while physical, may not necessarily be tangible. Although computing device 1804 of FIG. 11 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1822 may comprise any non-transitory storage mechanism. Memory 1822 may comprise, for example, primary memory 1824 and secondary memory 1826, additional memory circuits, mechanisms, or combinations thereof may be used. Memory 1822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1822 may be utilized to store a program of executable computer instructions. For example, processor 1820 may fetch executable instructions from memory and proceed to interpret and execute the fetched instructions. Memory 1822 may also comprise a memory controller for accessing device readable-medium 1840 (e.g., comprising a non-transitory storage medium) that may carry and/or make accessible digital content, which may include code, and/or instructions, for example, executable by processor 1820 and/or some other device, such as a controller, as one example, capable of executing computer instructions, for example. Under direction of processor 1820, a non-transitory memory, such as memory cells storing physical states (e.g., memory states), comprising, for example, a program of executable computer instructions, may be executed by processor 1820 and able to generate signals to be communicated via a network, for example, as previously described. Generated signals may also be stored in memory, also previously suggested. In a particular implementation, processor 1820 may include general processing cores and/or specialized co-processing cores (e.g., signal processors, graphical processing unit (GPU) and/or neural network processing unit (NPU)), for example.

Memory 1822 may store electronic files and/or electronic documents, such as relating to one or more users, and may also comprise a computer-readable medium that may carry and/or make accessible content, including code and/or instructions, for example, executable by processor 1820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, service codes, tokens, computed likelihoods, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 11, processor 1820 may comprise one or more circuits, such as digital circuits, to perform at least a portion of a computing procedure and/or process. By way of example, but not limitation, processor 1820 may comprise one or more processors, such as controllers, microprocessors, microcontrollers, application specific integrated circuits, GPUs, NPUs, digital signal processors, programmable logic devices, field programmable gate arrays, the like, or any combination thereof. In various implementations and/or embodiments, processor 1820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 11 also illustrates device 1804 as including a component 1832 operable with input/output devices, for example, so that signals and/or states may be appropriately communicated between devices, such as device 1804 and an input device and/or device 1804 and an output device. A user may make use of an input device, such as a computer mouse, stylus, track ball, microphone, scanner, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A system to be disposed in a vehicle, the system comprising:
   one or more memory devices; and
   one or more processors coupled to the one or more memory devices to:
      determine features indicative of a context in which a driver is currently operating the vehicle;
      determine a plurality of available vehicle user interface actions for the context;
      calculate a posterior probability for each action in the plurality of available vehicle user interface actions;
      generate a prediction of a future vehicle user interface action based, at least in part, on the posterior probability for each action in the plurality of available vehicle user interface actions; and
      cause a user interface in the vehicle to generate an output based on the prediction of the future vehicle user interface action.

2. The system of claim 1, wherein the features include a time of day.

3. The system of claim 1, wherein the features include a day of the week.

4. The system of claim 1, wherein the features include a longitude value and a latitude value.

5. The system of claim 1, wherein the prediction of the future vehicle user interface action is further generated based on the features.

6. The system of claim 1, wherein the prediction of the future vehicle user interface action is further generated based on user action context parameters relating past vehicle user interface actions requested by the driver.

7. The system of claim 6, wherein the past vehicle user interface actions are based on a reliability weight.

8. The system of claim 7, wherein the reliability weight is computed based on past predictions.

9. The system of claim 7, wherein the reliability weight is computed based on actual observed vehicle user interface actions.

10. The system of claim 7, wherein the reliability weight is conditioned on the features.

11. The system of claim 1, wherein the prediction of the future vehicle user interface action is further generated based on a sum of probabilities based on an established model weighted according to computed reliability weights.

12. The system of claim 1, wherein for each of the plurality of available vehicle user interface actions the one or more processors are further configured to:
    compute a probability of the features indicative of a contemporaneous context;
    sum computed probabilities of the contemporaneous context conditioned on the plurality of available vehicle user interface actions; and
    determine the parameters indicative of posterior probability conditioned on the features indicative of the contemporaneous context based, at least in part, on the summed computed probabilities.

13. The system of claim 12, wherein the one or more processors are further configured to:
    identify a plurality of context attributes of the features indicative of the context in which the driver is currently operating the vehicle;
    establish a model for each of the plurality of context attributes of the features of the context in which the driver is currently operating the vehicle; and
    determine computed probabilities of the features indicative of the context in which the driver is currently operating the vehicle conditioned on the plurality of available vehicle user interface actions based, at least on in part, on the models of the context attributes of the features indicative of the context in which the driver is currently operating the vehicle.

14. The system of claim 13, wherein the one or more processors are further configured to:
    for each established model, compute a reliability weight based, at least in part, on past predictions and associated detected actual observed vehicle user interface actions; and
    for at least one of the plurality of available vehicle user interface actions, determine a predicted probability of at least one of the plurality of available vehicle user interface actions based, at least in part, on a sum of probabilities based on the established model weighted according to computed reliability weights.

15. The system of claim 1, wherein the one or more processors are further configured to:
    receive updated features indicative of the context in which the vehicle is currently operating;
    determine whether a predetermined amount of time has elapsed since the prediction was generated; and
    responsive to such a determination that the predetermined amount of time has elapsed, generate an update of the prediction of the future vehicle user interface action.

16. The system of claim 15, wherein the one or more processors are further configured to:
    provide signals the user interface to present an update of options to the driver based, at least in part, on the update of the prediction of the future vehicle user interface action.

17. The system of claim 16, wherein the one or more processors are further configured to:
    cause an output device of the vehicle to present one or more selectable updated options based, at least in part, on the update of the prediction of the future vehicle user interface action.

18. The system of claim 1, wherein the posterior probability for each action in the plurality of available vehicle user interface actions is based, at least in part, on a Bayes model.

19. A computer-implemented method for training a model for predicting a future vehicle user interface action, the method comprising:
- determine features indicative of a context in which a driver is currently operating the vehicle;
- determine a plurality of available vehicle user interface actions for the context;
- calculate a posterior probability for each action in the plurality of available vehicle user interface actions;
- generate a prediction of the future vehicle user interface action based, at least in part, on the posterior probability for each action in the plurality of available vehicle user interface actions; and
- cause a user interface in the vehicle to generate an output based on the prediction of the future vehicle user interface action.

20. An article comprising a non-transitory storage medium comprising computer-readable instructions stored thereon, the instructions to be executable by one or more processors to:
- determine features indicative of a context in which a driver is currently operating the vehicle;
- determine a plurality of available vehicle user interface actions for the context;
- calculate a posterior probability for each action in the plurality of available vehicle user interface actions;
- generate a prediction of the future vehicle user interface action based, at least in part, on the posterior probability for each action in the plurality of available vehicle user interface actions; and
- cause a user interface in the vehicle to generate an output based on the prediction of the future vehicle user interface action.

* * * * *